United States Patent
Deiss et al.

(10) Patent No.: US 9,828,765 B2
(45) Date of Patent: *Nov. 28, 2017

(54) SUPPORT AND INSULATION ELEMENT FOR SUPPORTING AND INSULATING A WINDOW FRAME

(71) Applicant: ISO-Chemie GmbH, Aalen (DE)

(72) Inventors: Martin Deiss, Abtsgmuend (DE); Andreas Lange, Urbach (DE)

(73) Assignee: ISO-Chemie GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/156,736

(22) Filed: May 17, 2016

(65) Prior Publication Data

US 2016/0340890 A1 Nov. 24, 2016

(30) Foreign Application Priority Data

May 18, 2015 (EP) .................................... 15168003
Mar. 11, 2016 (EP) .................................... 16159957

(51) Int. Cl.
*E06B 3/96* (2006.01)
*E04B 1/76* (2006.01)
(Continued)

(52) U.S. Cl.
CPC .............. *E04B 1/7641* (2013.01); *E04B 1/40* (2013.01); *E04B 1/7604* (2013.01);
(Continued)

(58) Field of Classification Search
CPC .... E04B 1/7641; E04B 1/7604; E04B 1/7629; E04B 1/40; E06B 1/36; E06B 1/6015;
(Continued)

(56) References Cited

U.S. PATENT DOCUMENTS 3,396,539 A * 8/1968 Khan ...................... E21F 17/16
405/53
3,445,974 A * 5/1969 Bragman ................ E06B 3/273
29/514
(Continued)

FOREIGN PATENT DOCUMENTS

CA 2858563 A1 * 2/2015 ............ E04F 19/061
CA 2879234 A1 * 7/2015 .......... E04F 13/0733
(Continued)

*Primary Examiner* — Jeanette E Chapman
(74) *Attorney, Agent, or Firm* — Jansson Munger McKinley & Kirby Ltd.

(57) ABSTRACT

The support and insulation element for supporting and insulating a window frame has a support part and an insulating part. The support part has a first leg comprising a first side surface, a second leg, which projects from the first leg, and a third leg, which projects from the first leg a certain distance away from the second leg. The support part is made of load-bearing material. The insulating part is arranged at least on the side of the first leg of the support part opposite the first side surface and is made of compacted mineral wool or a rigid foam. The insulating part comprises two slots, into which the second leg and the third leg of the support part are inserted. The insulating part surrounds three sides of both the second leg and the third leg of the support part.

10 Claims, 7 Drawing Sheets

(51) Int. Cl.
    *E06B 1/12*     (2006.01)
    *E06B 1/26*     (2006.01)
    *E06B 1/06*     (2006.01)
    *E06B 1/02*     (2006.01)
    *E04B 1/41*     (2006.01)
    *E06B 1/60*     (2006.01)
    *F16M 13/02*     (2006.01)
    *E06B 1/36*     (2006.01)
    *E06B 1/62*     (2006.01)

(52) U.S. Cl.
    CPC .............. *E04B 1/7629* (2013.01); *E06B 1/02* (2013.01); *E06B 1/06* (2013.01); *E06B 1/12* (2013.01); *E06B 1/26* (2013.01); *E06B 1/36* (2013.01); *E06B 1/6015* (2013.01); *E06B 1/62* (2013.01); *E06B 3/9616* (2013.01); *E06B 3/9636* (2013.01); *F16M 13/02* (2013.01)

(58) Field of Classification Search
    CPC ........ E06B 3/9616; E06B 1/26; E06B 3/9636; E06B 1/12; E06B 1/06; E06B 1/62; E06B 1/02; F16M 13/02
    See application file for complete search history.

(56) References Cited

U.S. PATENT DOCUMENTS 6,393,779 B1 * 5/2002 Boldt ........................ E06B 1/10
                                                                                                   52/204.1
2008/0271413 A1 * 11/2008 Michaud ............... E06B 1/6069
                                                                                                   52/786.13

FOREIGN PATENT DOCUMENTS

| DE | 202012008857 U1 | | 1/2013 | | |
|---|---|---|---|---|---|
| DE | 202012010243 U1 | * | 1/2013 | ........... | E04B 1/7641 |
| DE | 202012010243 U1 | | 3/2013 | | |
| GB | 2036838 A | * | 7/1980 | ............. | E06B 3/105 |
| KR | 2013129632 A | * | 11/2013 | ............... | E06B 1/32 |
| WO | 2015043719 | | 4/2015 | | |
| WO | WO-2016186978 A1 | * | 11/2016 | ............... | E06B 1/02 |

\* cited by examiner

US 9,828,765 B2

SUPPORT AND INSULATION ELEMENT FOR SUPPORTING AND INSULATING A WINDOW FRAME

CROSS REFERENCE TO RELATED APPLICATION

This application claims priority based on European patent applications EP 15 168 003.0 filed May 18, 2015, and EP 16 159 957.6 filed Mar. 11, 2016. The entire disclosure and contents of these applications are incorporated by reference into the present application.

BACKGROUND OF THE INVENTION

The invention relates to a support and insulation element for supporting and insulating a window frame.

Support and insulation elements of this type have been in use for a number of years in conjunction with composite thermal insulation systems to extend a wall opening for a window artificially toward the outside, i.e., into the thermal insulation plane or air layer plane.

According to EP 2 639 394 A2, one side of a support part of rigid, load-bearing foam is screwed to the wall and serves to support the window frame to be inserted, especially at the bottom. In this composite thermal insulation system, an outer wall and the inner wall form an intermediate space, in which the support part is arranged. The load-bearing support part with a more-or-less triangular cross section is supplemented by an insulating part, which may consist of rigid flexible foam and cooperates with the support part to form a two-part body with a preferably rectangular cross section. After the support part has been screwed to the inner wall, a separate step is required to connect the insulating part to the support part.

SUMMARY OF THE INVENTION

It is an object of the present invention to provide a support and insulation element which allows especially easy transport and installation and to indicate a corresponding method for the installation of this support and insulation element.

According to an aspect of the invention, the support and insulation element for supporting and insulating a window frame comprises a support part having a first leg, which comprises a first side surface. The support part further has a second leg, which projects from the first leg on the side opposite the first side surface, and a third leg, which is a certain distance away from the second leg and projects from the first leg on the side opposite the first side surface. The support part is made of load-bearing material. The support and insulation element also comprises an insulating part, which is arranged at least on the side of the first leg of the support part opposite the first side surface and is made of compacted mineral wool or of rigid foam. The insulating part comprises two slots, into which the second and third legs of the support part are inserted, wherein the insulating part surrounds three sides of both the second leg and the third leg of the support part.

In this way, a support and insulation element is created, by which an optimal insulating effect is achieved and which simultaneously is simple in structure and easy to install. As a result of this configuration, furthermore, the insulating part can be easily set onto the second and third legs of the support part. In addition, the configuration of the support part with three legs makes it possible to stiffen the support part in an especially effective manner.

In a preferred embodiment, the insulating part surrounds three sides of both the second leg and the third leg of the support part substantially completely. This eliminates the need for any additional insulating measures.

In a preferred embodiment, the insulating part consists of a one-piece unit. This facilitates the handling and the installation of the support and insulation element. This also ensures the insulating effect without any further measures.

The first, second, and third legs of the support part are made of metal, preferably steel or aluminum. This ensures that the loads can be absorbed and allows low-cost manufacturing.

In a preferred embodiment, the second and third legs of the support part have a thickness in the range of 0.5-20 mm, and preferably of 1-15 mm. As a result, it is ensured that the support part can be securely fastened to the window frame, while at the same time it becomes easy to set the insulating part onto the support part. The second and third legs are preferably of uniform thickness over their entire length. The second leg can preferably have the same thickness as the third leg.

The second leg preferably projects at a right angle from the first leg, and the third leg projects from the first leg parallel to the second leg. In this way, the insulating part can be easily mounted on the second and third legs of the support part and preferably holds itself in place there by a friction-fit.

In a preferred embodiment, the support part also comprises a support block, which is arranged in the area of the first side surface and which serves to contact the wall. In this way, the window frame can be installed with an even greater offset to the wall.

According to another aspect of the invention, a building section comprises a wall and at least one support and insulation element according to the above-described configuration standing laterally out from the wall. The first leg of the support part is screwed to the wall by at least one fastening element. A window frame is screwed to the second and third legs of the support part by at least one screw element under interposition of at least one section of the insulating part.

As a result, the load exerted by the weight of the window is reliably absorbed, while at the same time optimal insulation between the window frame and the masonry is guaranteed.

According to another aspect of the invention, a method for installing a window frame in a wall of a building section comprises the following steps: providing at least one support part and at least one insulating part, wherein the at least one support part comprises a first leg, which has a first side surface, a second leg, which projects from the first leg on a side opposite the first side surface, and a third leg, which is a certain distance away from the second leg and projects from the first leg on the side opposite the first side surface, wherein the at least one support part is made of load-bearing material, wherein the at least one insulating part is made of compacted mineral wool or of a rigid foam, and wherein the at least one insulating part comprises two slots; screwing the first leg of the at least one support part to the wall by at least one fastening element; setting the at least one insulating part onto the at least one support part in such a way that the second and third legs of the at least one support part fit into the two slots in the at least one insulating part, so that the at least one insulating part is arranged at least on the side of the first leg of the at least one support part opposite the first side surface and surrounds three sides of both the second and third legs of the at least one support part; and screwing the window frame to the second and third legs of the support part of the at least one support and insulation element under interposition of at least one section of the insulating part.

This method is especially user-friendly and can be implemented with little effort. In addition, because the window frame is screwed to both the second and third legs of the support part, the screw element is very effectively prevented from tilting, only a small amount of material being sufficient for this purpose.

It is preferable for the at least one insulating part to be adhesively bonded to the at least one support part. This serves to connect the insulating part and the support part reliably together.

It is also preferable for the at least one insulating part to be adhesively bonded to the wall. As a result, the solidity of the support and insulation element is promoted even more, and ideally there will be an air-tight seal of the overall structure against the body of the building.

DETAILED DESCRIPTION

Figure 1:
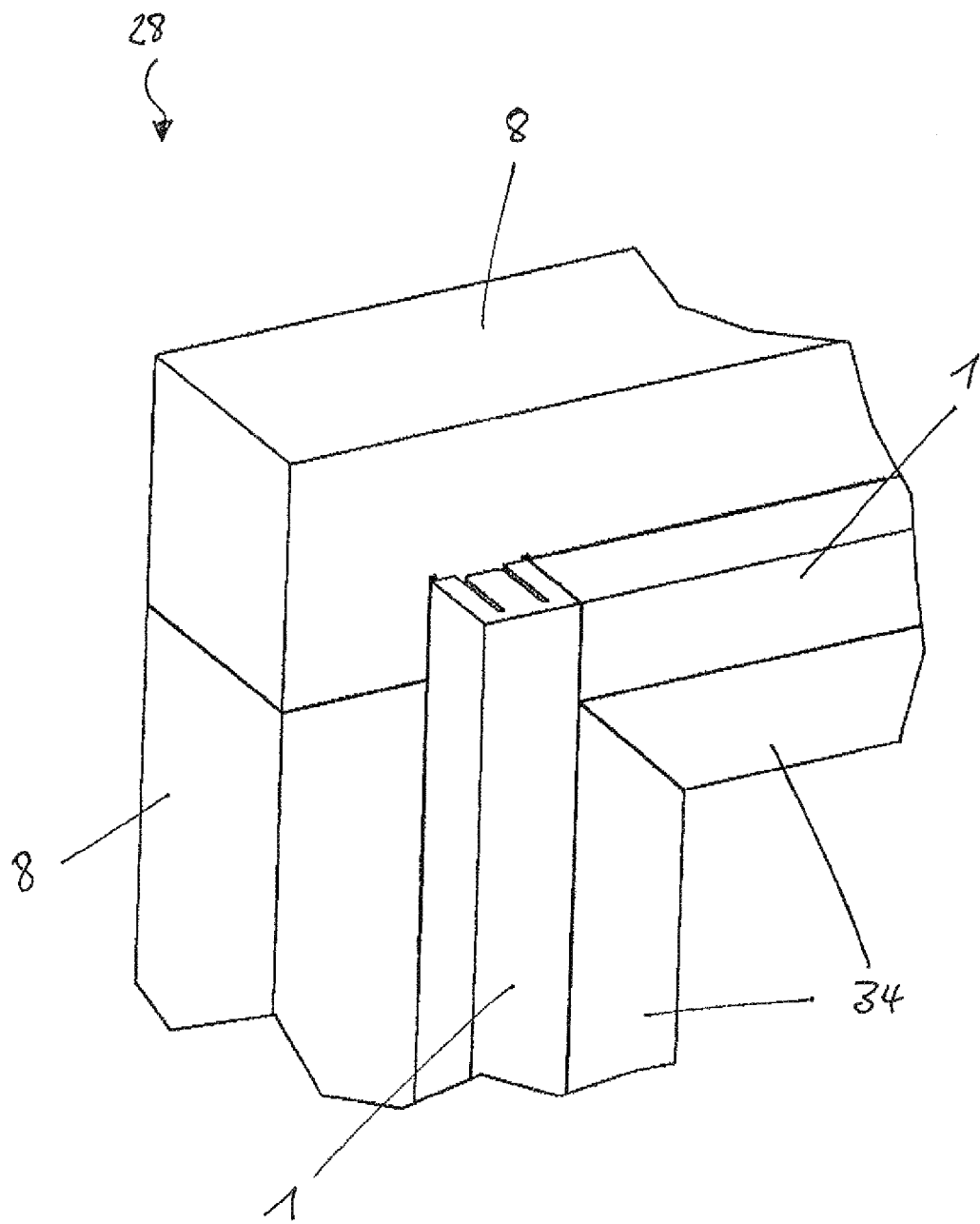
FIG. 1 is a perspective schematic diagram of a section of a window opening in a masonry wall with several support and insulation elements placed around the window opening.
Figure 2:
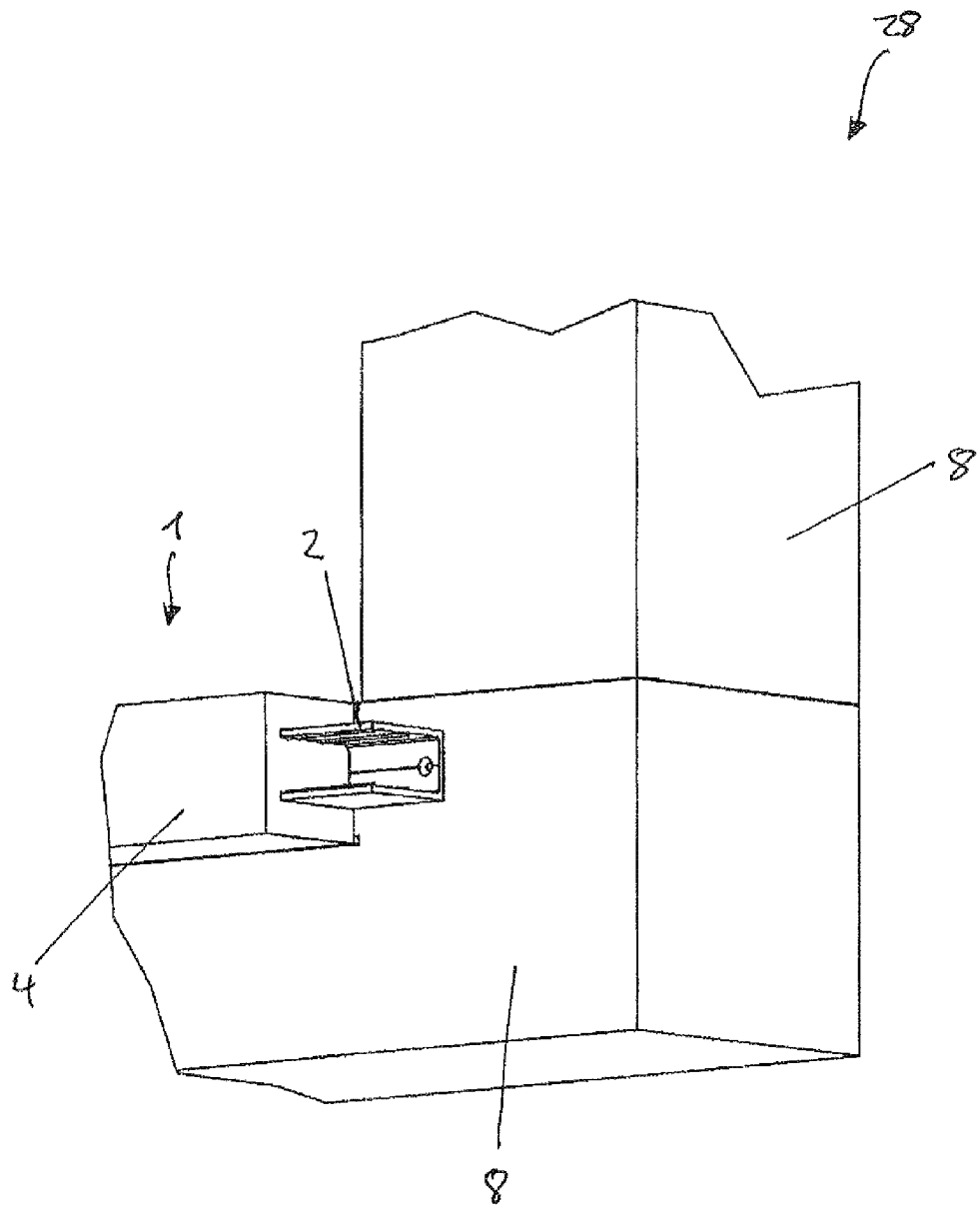
FIG. 2 is a perspective schematic diagram of a section of a building with a support and insulation element attached to it, wherein, for the sake of clarity, the insulating part has been omitted from the section of the support and insulation element on the right.

FIGS. 1 and 2 show the installation of an embodiment of the support and insulation element according to the invention, wherein, in FIG. 2, the supported window frame 34 has been omitted.

The building section 28 shown here comprises not only the wall 8, to which the support part 2 is fastened, but usually also an outer wall (not shown), which is usually made of thermal insulation material. This outer wall is fastened either directly to wall 8 without an intermediate space, or an air space is left behind it, and the support and insulation element 1 is arranged in this intermediate space between wall 8 and the outer wall. Window frame 34 (FIG. 1; FIG. 7) is supported on the at least one support and insulation element 1. More accurately, it is supported on a side surface 6 of the support and insulation element 1, which is usually a side surface of the insulating part 4 (see FIGS. 3-7). As can be seen in FIG. 7, window frame 34 is basically screwed to the support and insulation element 1 by at least one screw element 35.

As can be seen in FIGS. 1 and 2, the support and insulation elements 1 are arranged around the entire window opening (only parts of two of the four sides of the window opening are shown). It is also possible, however, to install one or more support and insulation elements 1 only under the window opening, because that is where most of the weight of the window rests.

The one or more support and insulation elements 1 are screwed to the wall by fastening elements 20. In the concrete case, the fastening elements 20 are screws (see FIGS. 3-7). In addition, there can also be an adhesive bond between the support part 2 and wall 8.

In the installed state shown in FIGS. 1 and 2, the length of a support and insulation element 1 is substantially the same as the length or width of the window opening. It is also possible, however, to install several support and insulation elements 1 in a row along each side of the window opening. For example, the individual support and insulation elements 1 can be cut to size in such a way that they butt up against each other. At those points, at least the insulating parts 4 in question are preferably bonded to each other with an adhesive. A plug-in connection or a dovetail connection is also conceivable.

It is also conceivable, however, and even advantageous in many cases, for the individual support and insulation elements 1 not to butt up against each other but rather to have intermediate spaces between them, which are filled up with other materials such as insulating materials. In addition, it can be less expensive for the support part 2 to be arranged only at the fastening points required to bear the load of the window, whereas the insulating part 4 or some other insulating material is arranged without interruption all the way around the frame profile. Embodiments such as this will be discussed in greater detail below with reference to FIG. 6.

Details of the individual embodiments of the support and insulation elements 1 according to the invention will now be described more thoroughly with reference to FIGS. 3-7.

It should be pointed out in advance that the orientation of the support and insulation elements 1 in FIGS. 3-7 is always shown rotated 90° to the actual installation situation. The side surface 6, on which window frame 34 is supported, makes the orientation of the support and insulation element 1 clear in all of the figures.

Figure 3:
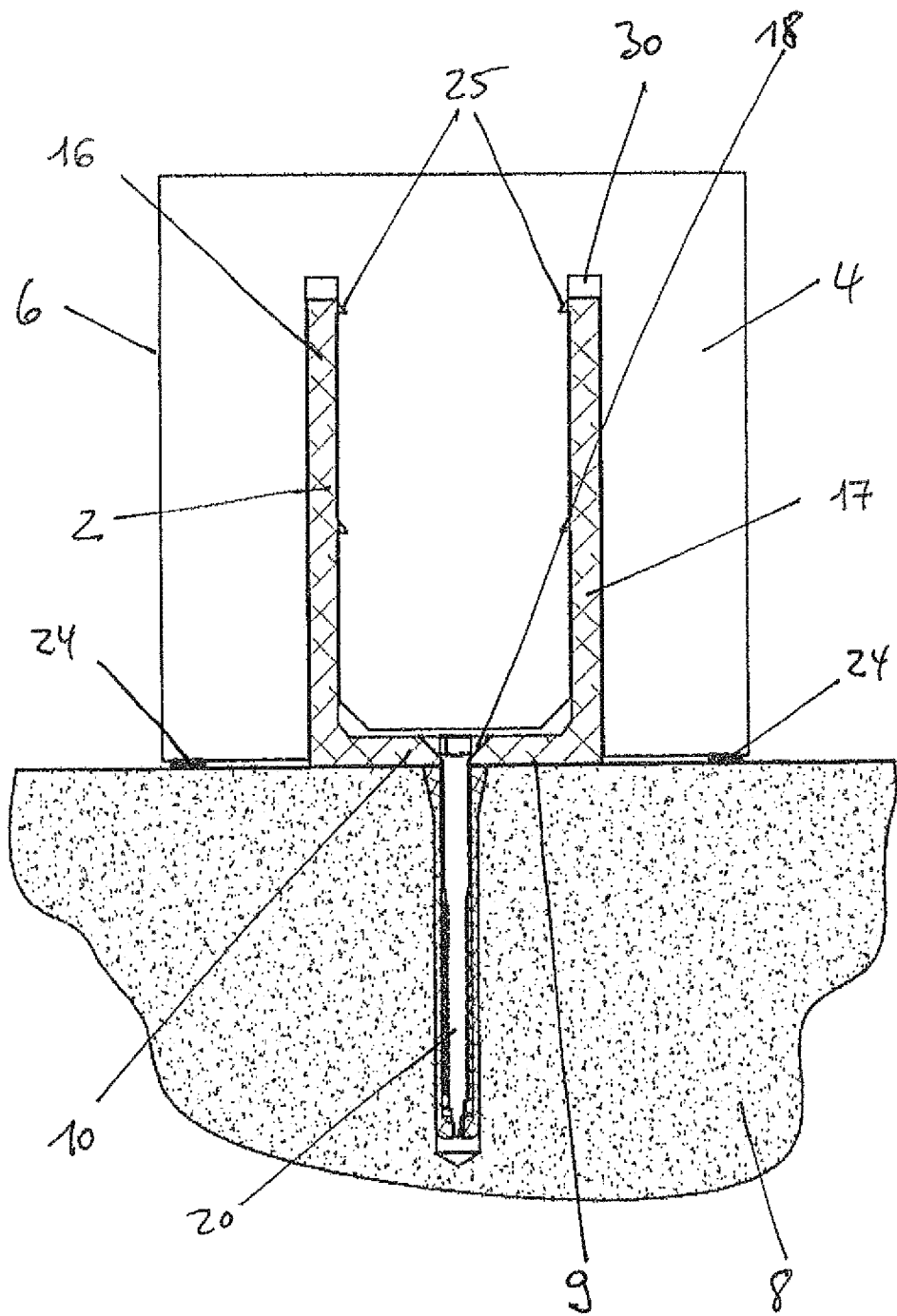
FIG. 3 is a cross-sectional view of the embodiment of the support and insulation element according to FIGS. 1 and 2 in the installed state.

FIG. 3 shows a first embodiment of the support and insulation element 1 according to the invention for supporting and insulating window frame 34, also illustrated in FIGS. 1 and 2.

The support and insulation element 1 comprises a support part 2 with a U-shaped cross section, to which an insulating part 4 with a substantially rectangular cross section is connected. Both support part 2 and insulating part 4 extend primarily in a longitudinal direction. The length of a support and insulation element 1 in the longitudinal direction can be selected freely but is preferably in the range of 2-600 cm. Support part 2 is preferably made as a one-piece unit. Support part 2 is made of a load-bearing material, which is adapted to carrying the weight of the window without undergoing deformation itself. Wood, plastic, or a rigid foam material can be used for support part 2. It is preferable, and especially advantageous for certain elements (e.g., the first leg 10 and the second leg 16) of support part 2, to use metal such as steel or aluminum.

Support part 2 comprises a side surface 9, extending in the longitudinal direction, which faces wall 8. In the example shown here, it rests against wall 8 (FIG. 3). First side surface 9 is part of first leg 10 of support part 2. In first leg 10, one or preferably several through-holes 18 can be provided, which allow the passage of one or more fastening elements 20 (FIG. 3). Each through-hole 18 thus passes through first leg 10 of support part 2 from an inner side surface, which is opposite first side surface 9, to first side surface 9. As can be seen in FIG. 3, each fastening element 20 serves to screw support part 2, and thus, the support and insulation element 1 to wall 8.

It is also possible not to provide a through-hole 18 in first leg 10 of support part 2 and instead to allow the worker to produce the through-hole in support part 2 on site.

Second leg 16 of support part 2 projects at a right angle from first leg 10, and after installation, it extends from leg 10 in the direction away from wall 8.

Support part 2 also comprises a third leg 17, which is parallel to second leg 16 and projects from first leg 10 a certain distance away from second leg 16. Third leg 17, in the example shown here, is exactly as long as second leg 16, but it can also have a different length. The thickness of third leg 17, in the example shown here, is also identical to that of second leg 16, but this too can be modified by the person skilled in the art as desired. Second and third legs 16, 17 in the present embodiment are configured as narrow strips with a narrow rectangular cross section, but they could also have a different cross section such as conical, for example.

Side surface 6 of support and insulation element 1, which serves to support window frame 34, always lies in the area of second leg 16 but is configured as the side surface of insulating part 4. In other words, window frame 34 never lies directly on second leg 16 of support part 2. Instead, there is always at least one section of insulating part 4 interposed between them. Additional insulating and damping material can be introduced, if desired, between insulating part 4 and window frame 34. The load is always absorbed primarily by second leg 16 of support part 2. For this purpose, window frame 34 is screwed through insulating part 4 to support part 2 (see more on this below with reference to FIG. 7).

Insulating part 4 is made of rigid foam or of compacted mineral wool. Materials of this type are usually self-supporting but cannot themselves bear a load. Examples of such materials include polystyrene, polyurethane, wood foam, etc., with densities of <100 kg/m$^3$, and preferably of <50 kg/m$^3$, which are considered thermal insulation materials and cannot bear the large static loads which similar rigid foams with densities of >100 kg/m$^3$ or even >200 kg/m$^3$ are capable of doing. Insulating part 4 is preferably air-tight.

Insulating part 4 is connected to support part 2 and arranged at least on the side of first leg 10 of support part 2 facing away from first side surface 9. Insulating part 4 in the example shown here is made as a one-piece unit. Insulating part 4 comprises two slots 30, into which second leg 16 and third leg 17 of the support part are inserted. Thus, insulating part 4 surrounds three sides of both second leg 16 and also third leg 17 of support part 2.

In the installation shown in FIG. 3, insulating part 4 can also be attached to wall 8 by adhesive bonds 24. Insulating part 4 can also be bonded adhesively to support part 2 in the area of first leg 10 and/or of second leg 16 and/or of third leg 17. The adhesive bonding can be accomplished over the entire surface area or only over certain sections of it. This also applies to the adhesive bonding 24 between insulating part 4 and wall 8.

Hooks 25 can be formed on second leg 16 and/or on third leg 17 of support part 2 to ensure that insulating part 4 is held securely in place on support part 2.

Within the scope of the invention, various modifications of the support and insulation element 1 are possible. Some of them are shown in FIGS. 4-7.

Figure 4:
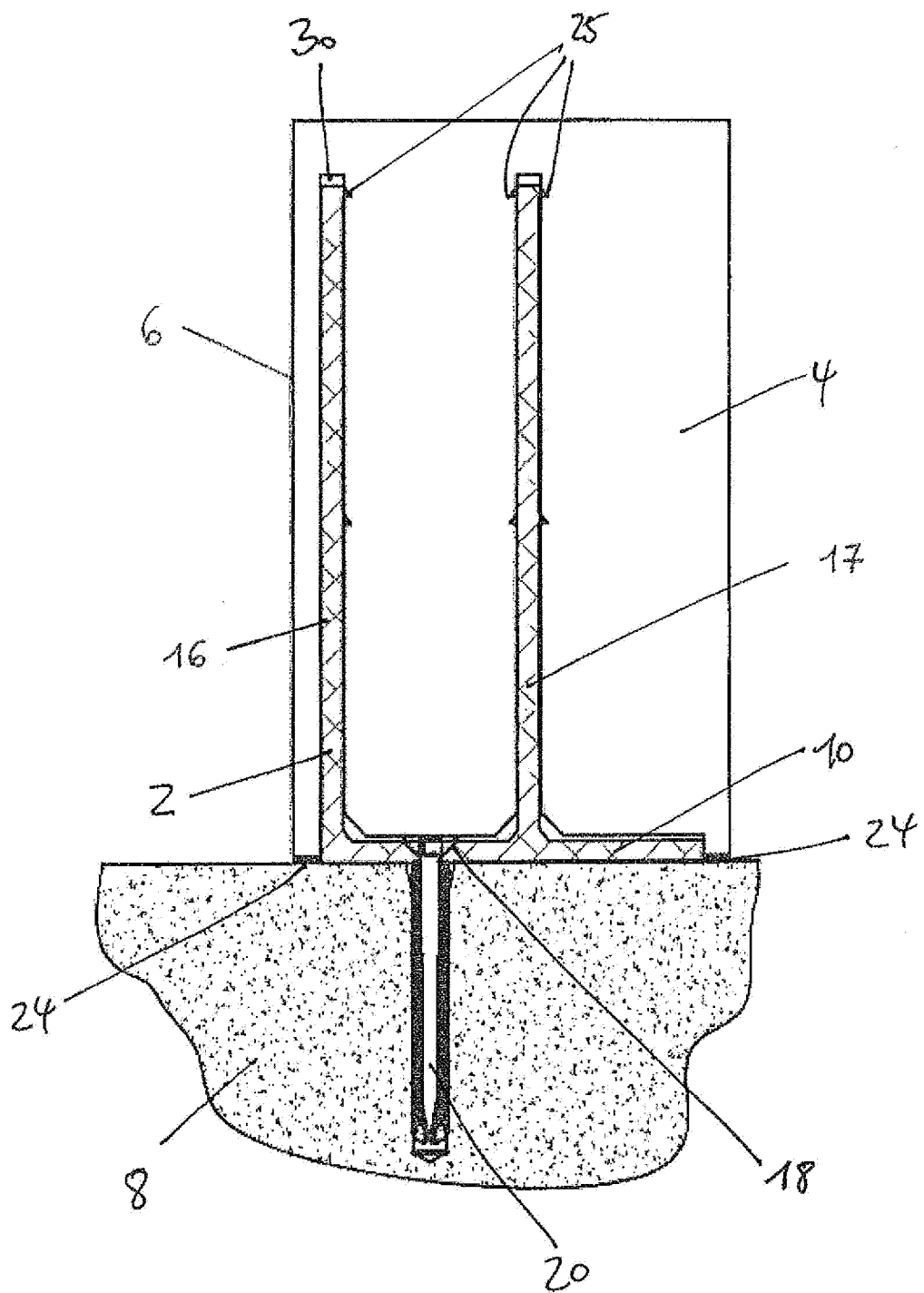
FIGS. 4 and 5 are cross-sectional views of additional embodiments of the support and insulation element in the installed state.

The embodiment according to FIG. 4 differs from that of FIG. 3 in that second leg 16 and third leg 17 of support part 2 are longer. In addition, first leg 10 of support part 2 is also longer, and thus, extends beyond second leg 16, as a result of which an angle shape differing from that of a U is obtained, namely, a shape similar to two "L's" placed side by side.

Figure 5:
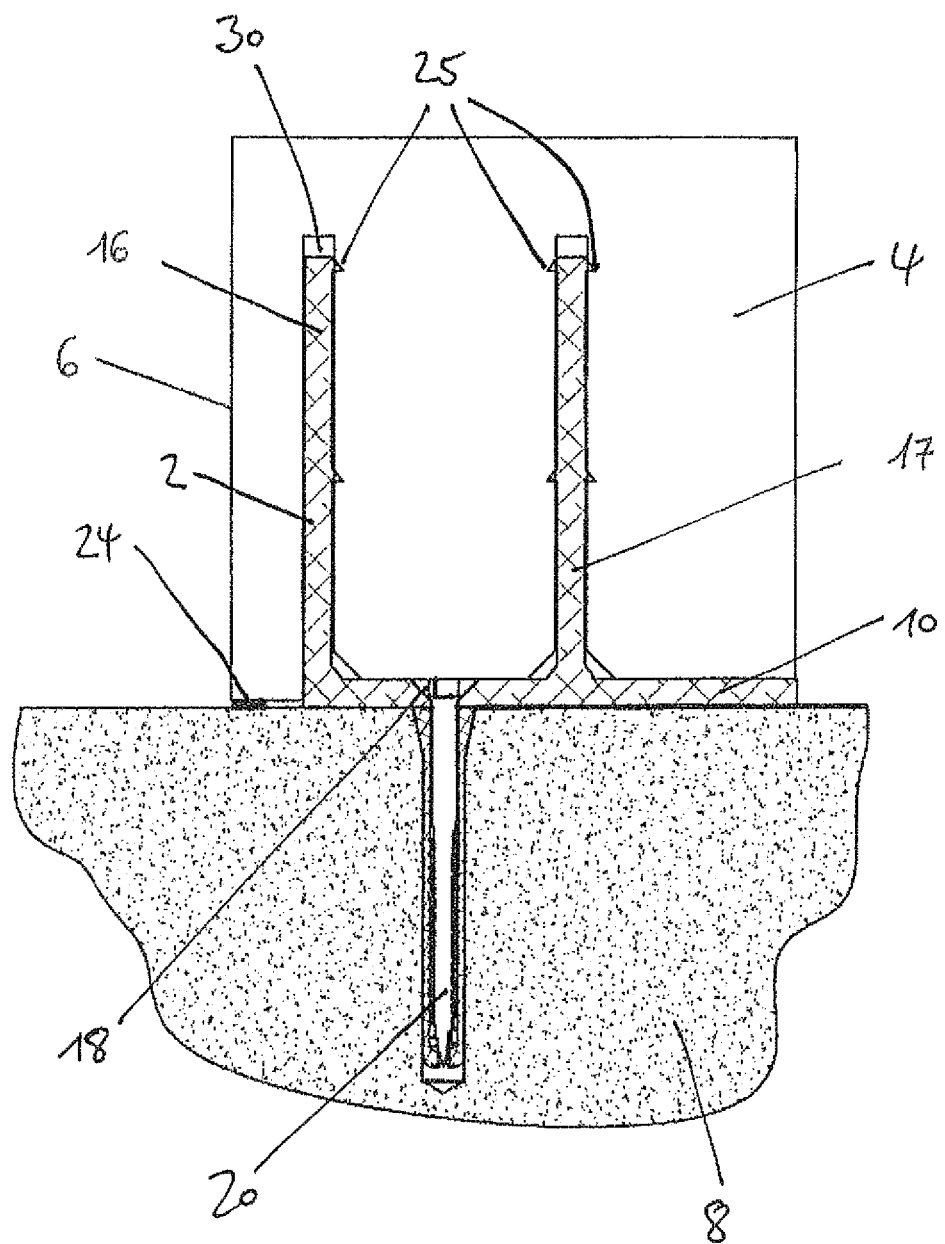

The embodiment shown in FIG. 5 differs from that of FIG. 4 in that second leg 16 and third leg 17 of support part 2 are shorter, and insulating part 4 has direct contact with wall 8 only on one side of support part 2. On the other side of support part 2, insulating part 4 rests on first leg 10 of support part 2.

Figure 6:
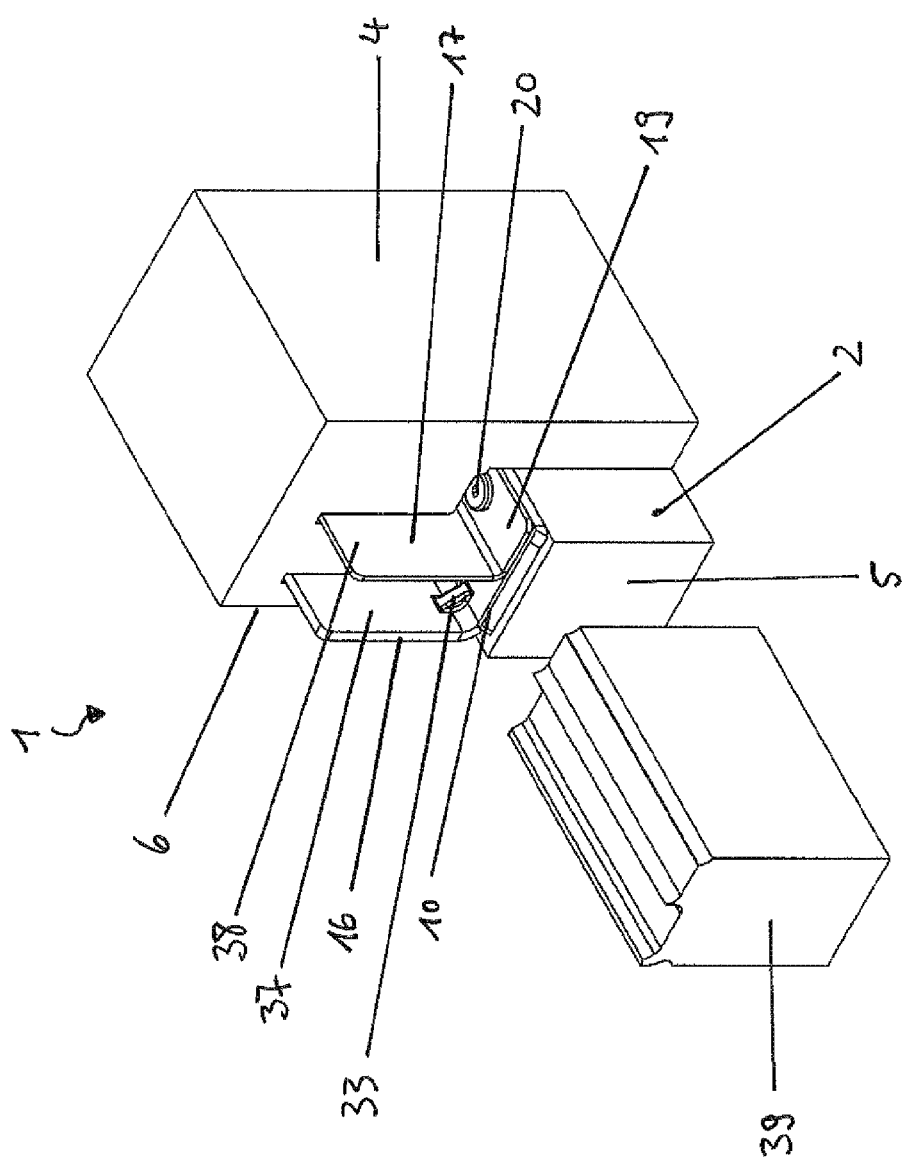
FIG. 6 is a perspective view of another embodiment of the support and insulating element.
Figure 7:
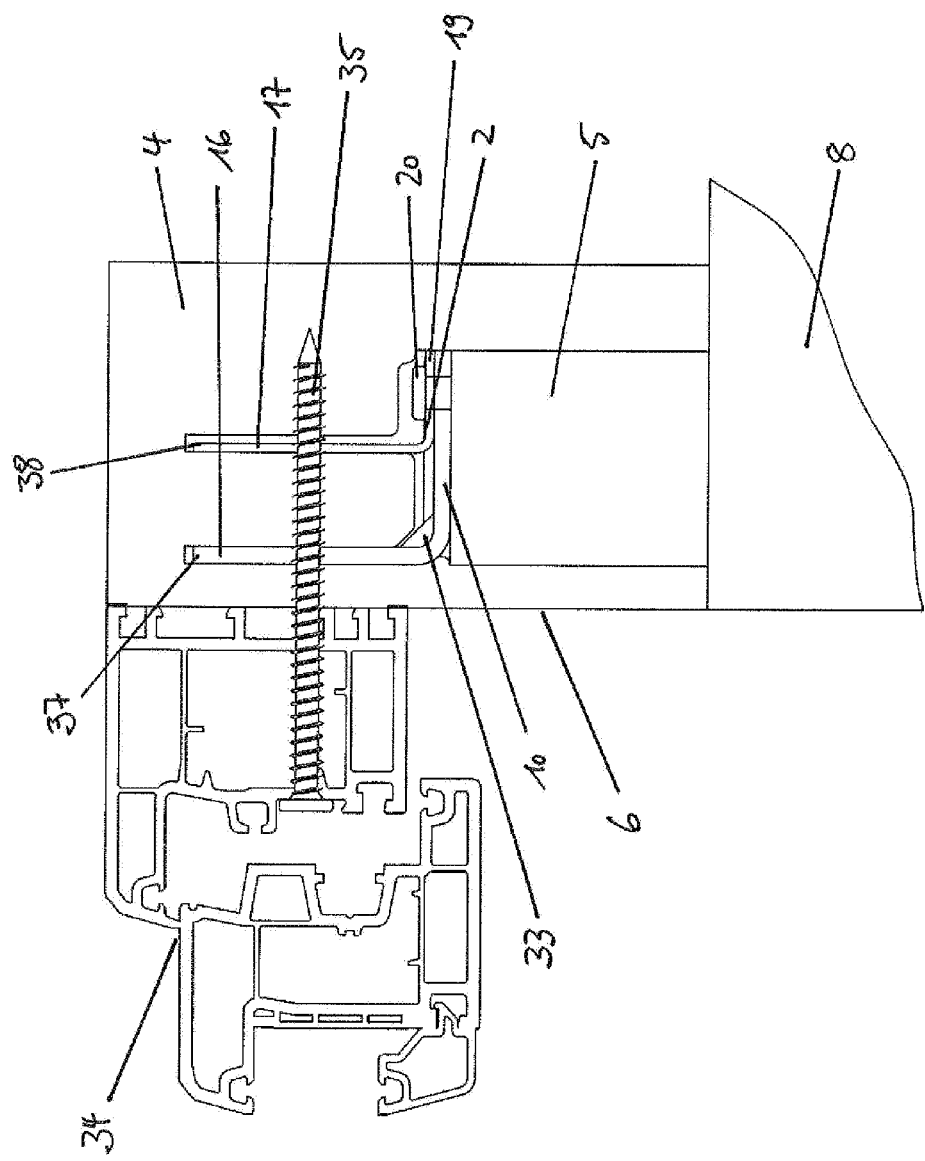
FIG. 7 is a cross-sectional view of the support and insulation element of FIG. 6 in the installed state together with the wall and window frame.

The embodiment of the support and insulation element 1 shown in FIGS. 6 and 7 contains two L-shaped angle elements 37, 38, one of which is set on top of the other and which are connected to each other and to wall 8 by a fastening element 20. Angle elements 37, 38 are preferably made of metal, and even more preferably of steel or aluminum. First angle element 37 forms first leg 10 and second leg 16 of support part 2, whereas angle element 38 comprises third leg 17 and fourth leg 19 of support part 2. Fourth leg 19 is arranged parallel to first leg 10 but is shorter. Fastening element 20, in the installed state, project through both fourth leg 19 and first leg 10 of support part 2.

In the corner area between first leg 10 and second leg 16, at least one stiffening rib 33 can be arranged. The shape and configuration of stiffening rib 33 can be varied by one skilled in the art. Other stiffening measures can also be helpful (e.g., curving the material).

To achieve a greater distance from wall 8, it is possible, in the area of first side surface 9 of first leg 10, to arrange a support block 5, which, in the installed state (FIG. 7), is arranged between first leg 10 of support part 2 and wall 8. Support block 5 is part of support part 2, and fastening elements 20 pass all the way through it. Support block 5 is made of load-bearing material. It preferably consists of a rigid, load-bearing foam with a density of >100 kg/m$^3$, and preferably of >200 kg/m$^3$. A rigid foam of this type is known under the name "Purenit" or "Compacfoam", for example. It is preferable for insulating part 4 also to surround the sides of support block 5 and even more preferable for it to extend all the way to wall 8.

As can be seen in FIG. 7, window frame 34, when in the installed state, is screwed to second leg 16 and third leg 17 of support part 2. In the present case, second leg 16 serves primarily to transmit the load by way of the at least one fastening element 20 to the wall 8 via support block 5, whereas third leg 17, by providing a second point of attachment, serves the important purpose of preventing screw element 35 from tilting.

Support blocks 5 can be configured in almost any way desired. They can also be added to the embodiments of the support part shown in FIGS. 3-5.

FIG. 6 also shows a schematic diagram of the previously mentioned situation in which the support and insulation elements 1 are present only in certain parts of the peripheral area of the window frame 34, where they are therefore responsible for absorbing the load, whereas, in the other areas, filler elements 39 are inserted. In the embodiment according to FIG. 6, filler elements 39 are configured so that they comprise a shape corresponding approximately to the shape of support part 2, so that an identically-shaped insulating part 4 can be set down on top of both support part 2 and filler element 39. In the present example, filler element 39 do not have legs corresponding to projecting legs of support part 2.

Filler element 39 is preferably made of the same material as that of insulating part 4. Filler elements 39 are preferably adhered to wall 8 and can also be adhered to support part 2.

In the areas where it is covered by filler elements 39, insulating part 4 is also preferably adhered to those elements.

All of the details of each of the various embodiments described above can be exchanged or modified as desired.

The concrete geometric configuration of support part 2 is variable, as long as a first leg 10 and the two other legs 16, 17, which are parallel to each other and project perpendicularly from the first leg, are present, wherein two legs 16, 17 must be a certain distance apart. Insulating part 4, furthermore, can also be composed of multiple parts.

All of the embodiments shown in FIGS. 3-7 can also be arranged in mirror-image fashion to what has been described above, that is, side surface 6, which serves to support window frame 34, can be arranged on the opposite side of insulating part 4. Under certain conditions, the designations of second leg 16 and third leg 17 of support part 2 would then have to be exchanged.

Finally, the number and spatial arrangement of fastening elements 20 and screw elements 35 are also freely selectable by the expert as a function of the concrete application.

A preferred method for installing a window frame 34 in a wall 8 of a building section 28 will now be described with reference to FIGS. 3-7. First, support part 2, in concrete terms at least first leg 10, is screwed to wall 8 by fastening elements 20. An adhesive bond can also be provided between support part 2 and wall 8.

Then insulating part 4 is set down onto support part 2 in such a way that second leg 16 and third leg 17 of support part 2 slide into the associated slots 30 in insulating part 4. Insulating part 4 is usually pushed down far enough that it contacts wall 8 or first leg 10 of support part 2. Under certain conditions, additional adhesive bonds 24 can be produced between insulating part 4 and wall 8. An adhesive bond can also be produced between insulating part 4 and support part 2 to ensure that the support and insulation 1 remains solidly bonded into a single unit. Insulating part 4 therefore usually also covers fastening elements 20. In the set-down state, insulating part 4 therefore surrounds three sides of both second leg 16 and third leg 17 of support part 2.

Then window frame 34 is screwed to second leg 16 and to third leg 17 of support part 2 of support and insulation element 1 under interposition of at least one section of insulating part 4.

In all of the embodiments, it is also conceivable that insulating part 4 could only partially, not completely, surround one or more sides of second leg 16 and/or third leg 17 of support part 2.

In the installed state, additional insulating materials can also be used for insulation.

In regard to the production of all of the adhesive bonds cited above, the adhesive, preferably in the form of beads of adhesive, is applied to at least one of the two parts to be bonded before the parts are assembled. Alternatively, any gaps or channels which may be present can also be filled afterwards with polyurethane foam, for example. In theory, it is even possible to produce a complete insulating part 4 on site by placing a mold around support part 2 fastened to wall 8 and filling the mold with foam.

A wide variety of materials are available for the various parts discussed and illustrated herein. While the principles of this device have been described in connection with specific embodiments, it should be understood clearly that these descriptions are made only by way of example and are not intended to limit the scope of the device.

The invention claimed is:

1. A building section comprising:
   a wall and at least one support and insulation element projecting laterally from the wall, the at least one support and insulation element comprising:
   a support part to which a window frame is screwed, the support part having (a) a first leg comprising a first side surface; (b) a second leg, which projects from the first leg on a side opposite the first side surface; and (c) a third leg, which is a certain distance away from the second leg and projects from the first leg on the side opposite the first side surface, wherein the support part is made of load-bearing material; and
   an insulating part, the insulating part is arranged on the side of the first leg opposite the first side surface and is made of compacted mineral wool or a rigid foam, wherein the insulating part comprises two slots, into which the second leg and the third leg of the support part are inserted, the insulating part surrounds three sides of both the second leg and the third leg of the support part, and the first leg of the support part is screwed to the wall by means of a fastening element; and
   a window frame, the window frame being screwed to the second leg and the third leg of the support part of the at least one support and insulation element by at least one screw element under interposition of at least one section of the insulating part.

2. The building section of claim 1 wherein the insulating part substantially completely surrounds three sides of both the second leg and the third leg of the support part.

3. The building section of claim 1 wherein the insulating part is made as a one-piece unit.

4. The building section of claim 1 wherein at least the first and second legs of the support part are made of metal.

5. The building section of claim 4 wherein the third leg is made of metal.

6. The building section of claim 1 wherein the second leg and the third leg of the support part have a thickness in the range of 0.5-20 mm.

7. The building section of claim 1 wherein the second leg and the third leg of the support part have a thickness in the range of 1-15 mm.

8. The building section of claim 1 wherein the second leg projects from the first leg at a right angle and the third leg projects from the first leg parallel to the second leg.

9. The building section of claim 1 wherein the insulating part is set onto the second leg and the third leg of the support part.

10. The building section of claim 1 wherein the support part also comprises a support block, which is arranged in an area of the first side surface and serves to make contact with a wall.

* * * * *